United States Patent [19]
Ackley

[11] Patent Number: 5,768,996
[45] Date of Patent: *Jun. 23, 1998

[54] METHOD FOR MAXIMIZING LOADING EFFICIENCY OF PELLET SHAPED ARTICLES

[76] Inventor: E. Michael Ackley, 1273 N. Church St., Moorestown, N.J. 08057

[ * ] Notice: The term of this patent shall not extend beyond the expiration date of Pat. No. 5,433,146.

[21] Appl. No.: 819,725

[22] Filed: Mar. 17, 1997

Related U.S. Application Data

[63] Continuation of Ser. No. 472,968, Jun. 7, 1995, Pat. No. 5,655,453, which is a continuation-in-part of Ser. No. 37,719, Mar. 25, 1993, Pat. No. 5,433,146, which is a continuation-in-part of Ser. No. 690,067, Apr. 23, 1991, abandoned, which is a continuation of Ser. No. 404,216, Sep. 7, 1989, abandoned, which is a continuation-in-part of Ser. No. 229,763, Aug. 5, 1988, Pat. No. 4,905,589, which is a continuation-in-part of Ser. No. 11,790, Feb. 6, 1987, abandoned.

[51] Int. Cl.[6] ................................................. B41F 17/08
[52] U.S. Cl. ............................................. 101/483; 101/35
[58] Field of Search ............................... 101/35, 483, 37, 101/40; 198/382, 384, 393, 396, 397

[56] References Cited

U.S. PATENT DOCUMENTS

| | | |
|---|---|---|
| 1,385,000 | 7/1921 | Griffing . |
| 2,655,247 | 10/1953 | Carroll et al. . |
| 2,837,042 | 6/1958 | Laval, Jr. . |
| 2,859,689 | 11/1958 | Ackley . |
| 2,863,588 | 12/1958 | Stover . |
| 3,084,781 | 4/1963 | Merrill . |
| 3,272,118 | 9/1966 | Ackley . |
| 3,556,281 | 1/1971 | Margaroli et al. . |
| 3,670,865 | 6/1972 | Garland . |
| 3,838,766 | 10/1974 | Wagers, Jr. et al. . |
| 3,889,591 | 6/1975 | Noguchi . |
| 4,126,219 | 11/1978 | Bross . |
| 4,308,942 | 1/1982 | Ackley . |
| 4,657,130 | 4/1987 | Ackley, Jr. et al. . |
| 4,732,263 | 3/1988 | Fransiscus . |

OTHER PUBLICATIONS

Documentation alleging sale of printing apparatus (effective Jul. 10, 1985) including purchase order, packing list, mechanical drawings (14 sheets) and photographs (7).
Markem Machine Manual Oct. 1984.

*Primary Examiner*—Ren Yan
*Attorney, Agent, or Firm*—Oliff & Berridge PLC

[57] ABSTRACT

A pellet marking device which includes a ramp-type carrier system for receiving pellet-shaped articles to be imprinted from a feed hopper of improved efficiency, and for conveying the received pellet-shaped articles to a printing device which is combined with the carrier system and which is appropriate for applying desired indicia to the particular product which is to be handled. This may include the more traditional contact-type printing systems which are useful in conjunction with the majority of pellet-shaped articles to be handled, as well as non-contacting ink-jet systems for applying indicia to pellet-shaped articles which do not lend themselves to contact-type printing procedures. An improved feed hopper is provided which not only contributes to the foregoing, but which also operates to significantly improve the efficiency of the system by ensuring that the pellet-receiving pockets of the pellet-conveying system are filled to the greatest extent possible while maintaining an effective production rate.

6 Claims, 12 Drawing Sheets

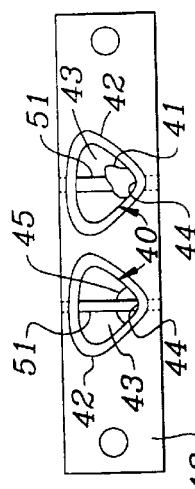
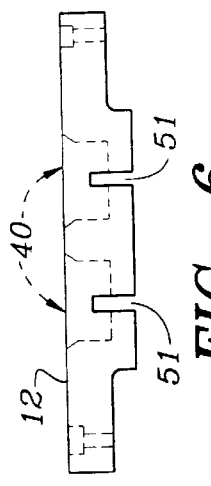
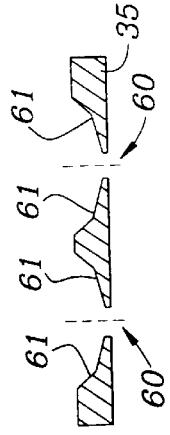
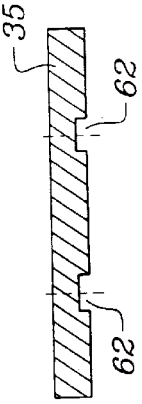
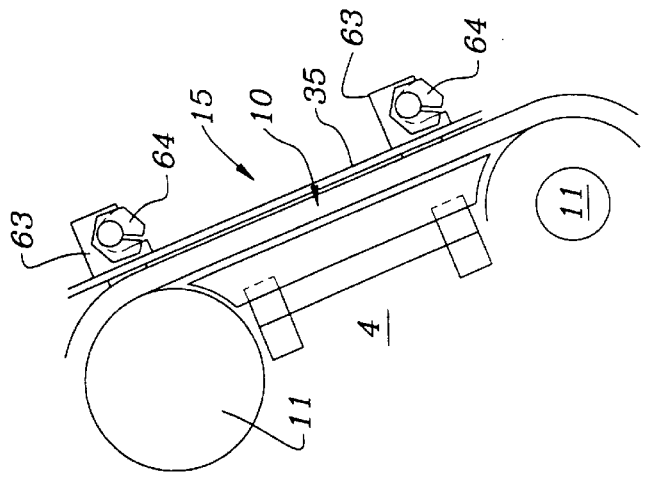
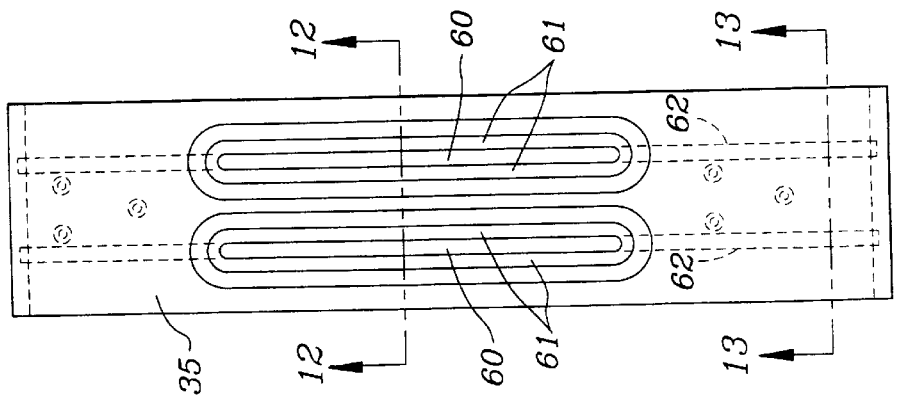

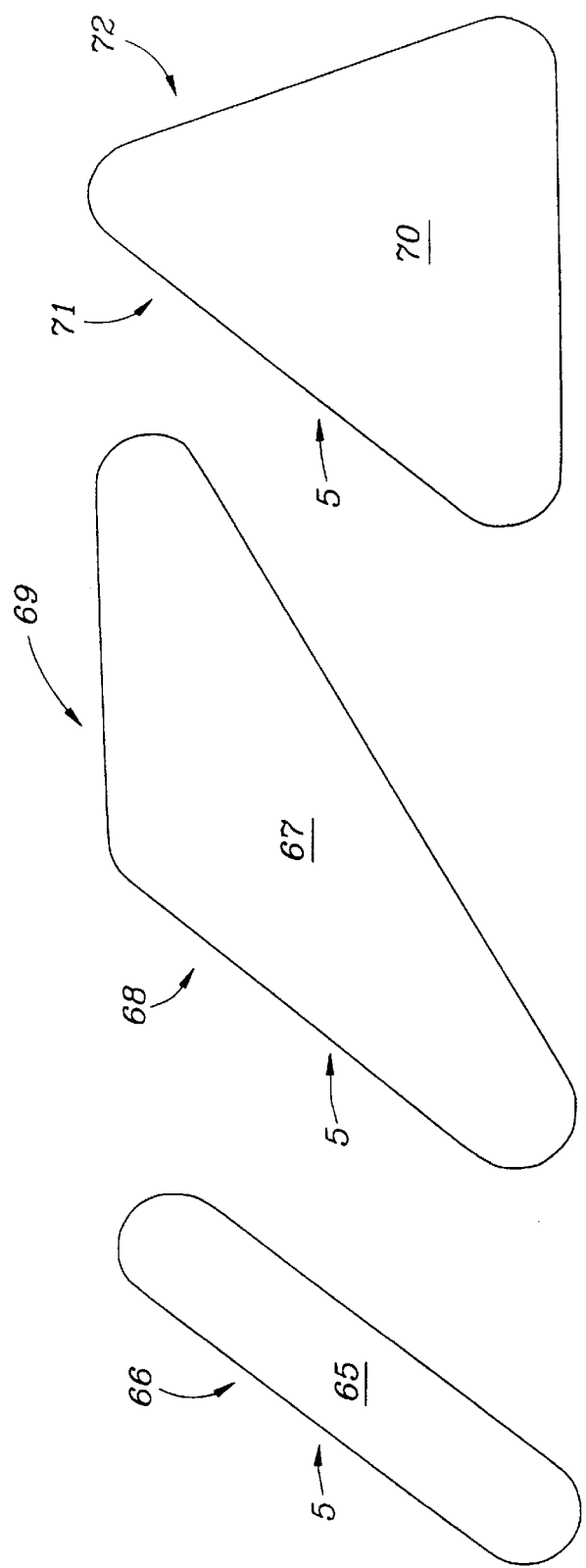

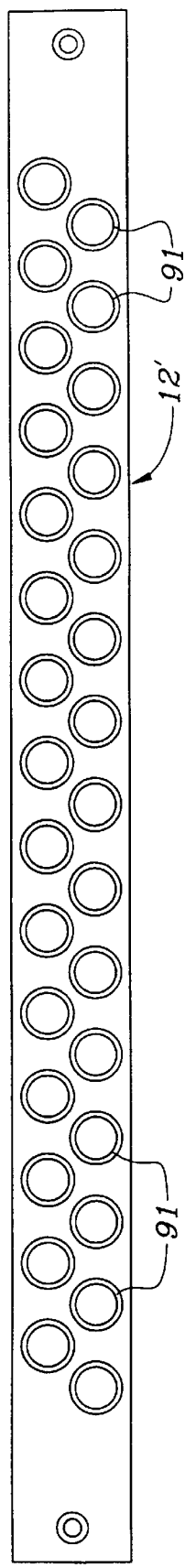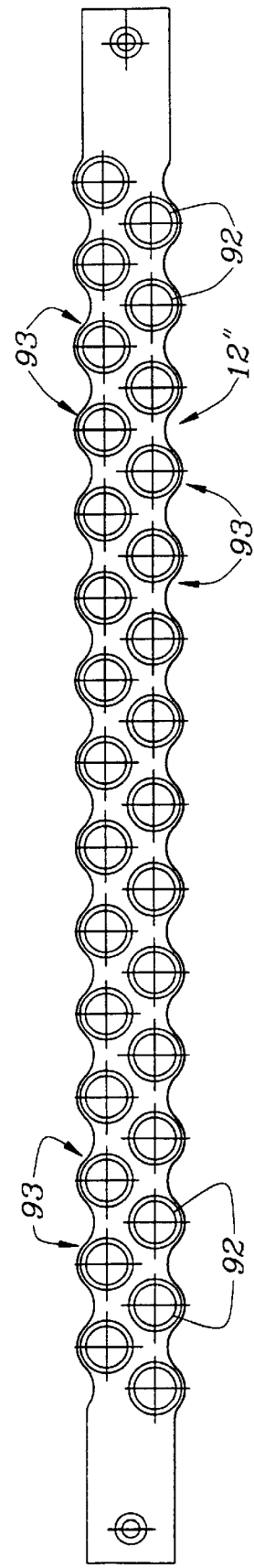

METHOD FOR MAXIMIZING LOADING EFFICIENCY OF PELLET SHAPED ARTICLES

RELATED CASES

This is a continuation of prior U.S. patent application Ser. No. 08/472,968, filed Jun. 7, 1995, and since allowed, which is a continuation-in-part of prior U.S. patent application Ser. No. 08/037,719, filed Mar. 25, 1993 and since issued as U.S. Pat. No. 5,433,146, which is a continuation-in-part of prior U.S. patent application Ser. No. 07/690,067, filed Apr. 23, 1991 and since abandoned, which is a continuation of prior U.S. patent application Ser. No. 07/404,216, filed Sep. 7, 1989 and since abandoned, which is a continuation-in-part of prior U.S. patent application Ser. No. 07/229,763, filed Aug. 5, 1988 and since issued as U.S. Pat. No. 4,905,589, issued Mar. 6, 1990, which is a continuation-in-part of prior U.S. patent application Ser. No. 07/011,790, filed Feb. 6, 1987 and since abandoned.

BACKGROUND OF THE INVENTION

The present invention relates generally to pellet marking devices, and in particular, to a pellet marking device of improved versatility and efficiency.

A variety of devices have been developed for applying desired indicia to pellet-shaped articles, including both regularly and irregularly shaped pellets. For example, U.S. Pat. Nos. 4,632,028; 4,500,012: 4,413,556; 4,394,933; 4,377,971; and 4,369,702 address various devices which may be used in applying indicia to articles such as candies, pharmaceutical capsules, tablets and the like, or any other pellet-shaped article to which identifying indicia are to be applied.

In terms of the means which are used to actually apply the indicia to these various articles, each of these devices, and the devices of the prior art, have conventionally made use of a contact-type printing system. To this end, a pair of rollers are provided including a design roll which forms the indicia to be applied to the articles, and which is disposed within an appropriate supply of ink, and a printing roll which is in contact with both the design roll and the articles which are to receive the indicia, for transferring the ink-laden indicia from the design roll to the articles in question. An exemplary description of such a device may be found in U.S. Pat. No. 4,528,904.

Each of the above-described pellet marking devices is therefore based upon a printing technique which requires direct contact between the printing assembly and the articles which are to receive the indicia. Often, contact between the printing device and the articles is beneficial in assuring that proper markings are transferred to the articles, and that the articles are maintained in proper position during this procedure. For example, direct contact between the printing device and the articles is often important in assuring that a sharp image is transferred to the product. In many cases, direct contact between the printing device and the articles is essential to such a transfer. This would particularly apply to the spin-printing of capsules, caplets and the like, since contact between the printing device and the articles which are to receive the indicia must be sufficient to cause the articles to spin within an appropriate carrier so that the desired indicia are properly applied about the circumference of the articles.

However, in some cases, the articles which are to receive the indicia have been found to be so fragile that a certain potential for breakage of the articles may arise in the course of the printing procedure. This problem most clearly manifests itself in the application of indicia to candies and the like, although similar problems may also be encountered in connection with certain pharmaceutical formulations, depending upon their consistencies. The contact pressure which is applied against such articles may be adjusted (reduced) in an effort to overcome this problem. However, this too presents a problem in that the resiliency of the printing roll tends to vary in use, causing changes over time. Moreover, this reduction in potential for breakage is achieved at the expense of less reliable printing, since contact between the printing device and the articles is reduced.

Such difficulties can result either in the incomplete application of indicia (partially or entirely) to the articles, at one extreme, or damage to the articles, at the other. These problems are further complicated when irregularly shaped pellets are to be marked, since the surface characteristics of such articles cannot be predicted, making the necessary penetration of the contacting printing device even more difficult to establish.

It therefore became desirable to develop a pellet marking device which could not only effectively handle the pellets with improved versatility and efficiency, to enhance a contact-type printing operation, but which could also provide an alternative to a contact-type printing operation to enable the application of indicia to pellets which are unable to satisfactorily withstand the constraints of actual contact with the printing device.

SUMMARY OF THE INVENTION

It is therefore a primary object of the present invention to provide a device for applying indicia to pellet-shaped articles with improved versatility and efficiency.

It is also an object of the present invention to provide a device for applying indicia to pellet-shaped articles which does not require contact with the articles to be imprinted.

It is also an object of the present invention to provide a non-contacting pellet marking device which minimizes, or effectively eliminates the potential for breakage of the product in the course of the printing operation.

It is also an object of the present invention to provide a non-contacting pellet marking device which is capable of applying indicia to both regularly shaped and irregularly shaped pellets.

It is also an object of the present invention to provide a contact-type pellet marking device which operates to apply indicia to the pellet-shaped articles at an increased rate of production.

It is also an object of the present invention to provide a contact-type pellet marking device which operates to apply indicia to the pellet-shaped articles with increased accuracy.

It is also an object of the present invention to provide a contact-type pellet marking device which operates to effectively apply indicia to pellet-shaped articles requiring specific alignments prior to the printing operation which is to take place.

It is also an object of the present invention to provide a pellet marking device with a more efficient mechanism for feeding pellet-shaped articles for subsequent imprinting.

It is also an object of the present invention to provide a pellet marking device which is capable of assuring that the desired indicia are completely and reliably applied to each of the pellet-shaped articles being processed.

It is also an object of the present invention to provide a pellet marking device having the foregoing capabilities, yet which is simple in construction, maintenance and operation.

These and other objects are achieved in accordance with the present invention by providing a pellet marking device which includes a ramp-type carrier system for receiving the pellet-shaped articles to be imprinted from a feed hopper of improved efficiency, and for conveying the received pellet-shaped articles to a printing device which is combined with the carrier system and which is appropriate for applying desired indicia to the particular product which is to be handled. This may include the more traditional contact-type printing systems which are useful in conjunction with the majority of pellet-shaped articles to be handled, as well as non-contacting ink-jet systems for applying indicia to pellet-shaped articles which do not lend themselves to contact-type printing procedures.

Previously, it would have been expected that the use of an ink-jet system to apply indicia to pellet-shaped articles would not produce a satisfactory result in view of various limitations inherent in the ink-jet system. For example, the lack of contact between the printing device and the pellets to receive the indicia makes reliable positioning of the articles extremely difficult. This would lead to the expectation that the indicia would not be reliably applied to each of the articles due to irregularities in their positioning. For similar reasons, an unacceptable decrease in the clarity of the transferred image would be expected.

Aggrevation of these problems would be expected when operating upon irregularly shaped pellets, such as candies or the like, or when using the types of dyes which the FDA has approved for use in connection with such applications. The FDA-approved dyes present a particularly difficult problem in conjunction with ink-jet systems in that they generally contain pigments and other diluents (or carrier) which must be approved for human consumption, but which tend to clog the very fine nozzles of the ink-jet printing system; more so than would ordinary dyes (which allow a greater leaway to alter the dye composition to facilitate spraying).

However, in accordance with the present invention, it has been found that these anticipated difficulties can be overcome by appropriately combining the ink-jet system with a pellet-conveying system which is especially configured to properly locate and maintain the pellet-shaped articles in proper position as they traverse the ink-jet system. The pellet-conveying system of the present invention further provides corresponding improvements in conjunction with contact-type printing operations, including those requiring special alignments of the pellet-shaped articles prior to their marking. An improved feed hopper is provided which not only contributes to the foregoing, but which also operates to significantly improve the efficiency of the system by ensuring that the pellet-receiving pockets of the pellet-conveying system are filled to the greatest extent possible while maintaining an effective production rate.

For further detail regarding a pellet-shaped article marking apparatus in accordance with the present invention, reference is made to the detailed description which is provided below, taken in conjunction with the following illustrations.

BRIEF DESCRIPTION OF THE DRAWINGS

FIG. 5 is a top plan view of a carrier bar used in the apparatus of FIG. 1.

FIG. 6 is a side elevational view of the carrier bar of FIG. 5.

FIG. 10 is a top plan view of a guide for use in connection with the apparatus of FIG. 1.

FIG. 11 is a partial, side elevational view of an adjustment mechanism for the guide of FIG. 10.

FIG. 12 is a sectional view of the guide of FIG. 10, taken along line 12—12.

FIG. 13 is a sectional view of the guide of FIG. 10, taken along the line 13—13.

FIGS. 18 to 20 are schematic representations of alternative embodiment conveying paths in accordance with the present invention.

FIG. 21 is a top plan view of an alternative embodiment carrier bar for attachment to the chain conveyor of the pellet marking apparatus.

FIG. 22 is a top plan view of yet another alternative embodiment carrier bar in accordance with the present invention.

In the several views provided, like reference numerals denote similar structure.

DETAILED DESCRIPTION OF PREFERRED EMBODIMENTS

Figure 1:
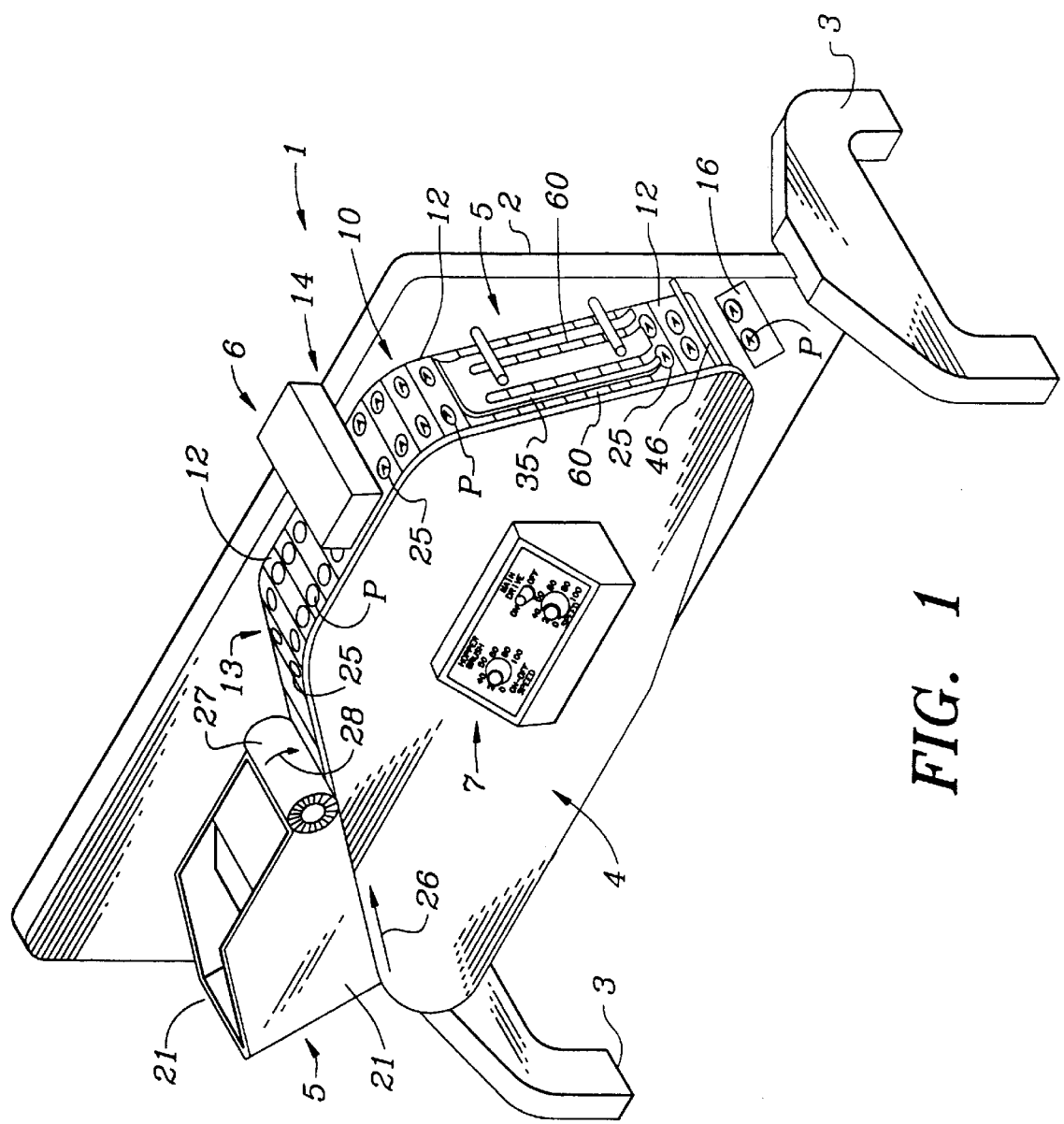
FIG. 1 is an isometric view of a pellet marking apparatus in accordance with the present invention.

FIG. 1 illustrates a pellet marking apparatus 1 for marking any of a variety of pellet-shaped articles with appropriate indicia. The pellet-shaped articles may be regularly shaped, such as capsules, caplets, pills, tablets and other spherical, oval or cylindrical, or even polygonal shapes, as well as irregularly shaped articles. The indicia to be applied to these articles may be varied according to need, depending upon the markings which are to be applied to the articles, but will generally be of a food-grade, or even a pharmaceutical grade, in view of the anticipated uses for such indicia. For purposes of illustration, pellets (P), both marked and unmarked, are shown in FIG. 1 only.

The pellet marking apparatus 1 is supported upon a frame 2 having spaced legs 3 for providing a free standing support. Extending from the frame 2 is a conveyor mechanism 4 for conveying pellets through the apparatus 1 as will be discussed more fully below, a feed hopper 5 for receiving a supply of pellets and for delivering the pellets to the conveyor mechanism 4 in organized fashion, and a printing head 6 positioned at an appropriate location along the conveyor mechanism 4. Operation of the resulting assembly is advantageously regulated from a centrally located control panel 7.

Figure 2:
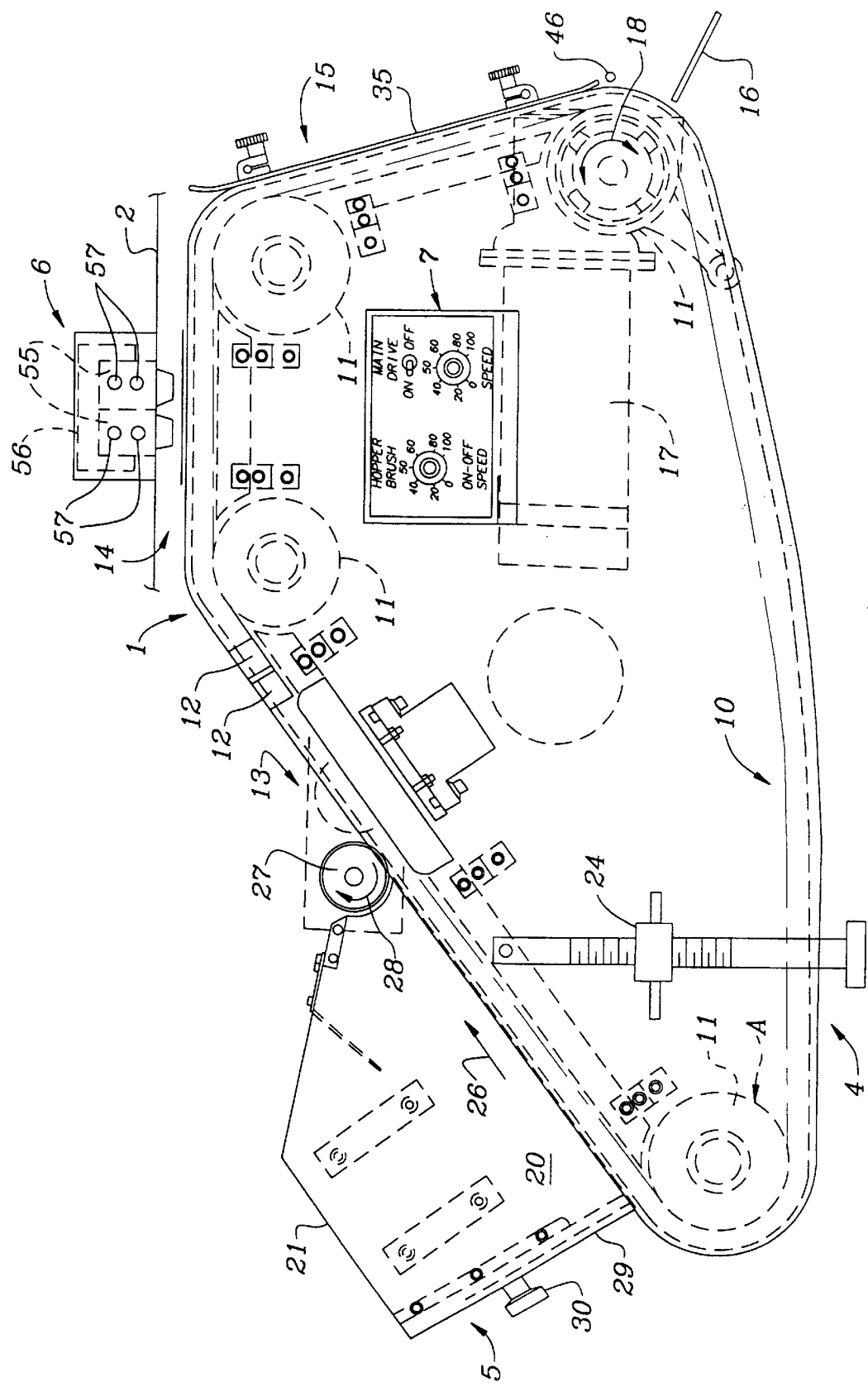
FIG. 2 is a side elevational view of the apparatus of FIG. 1.
Figure 3:
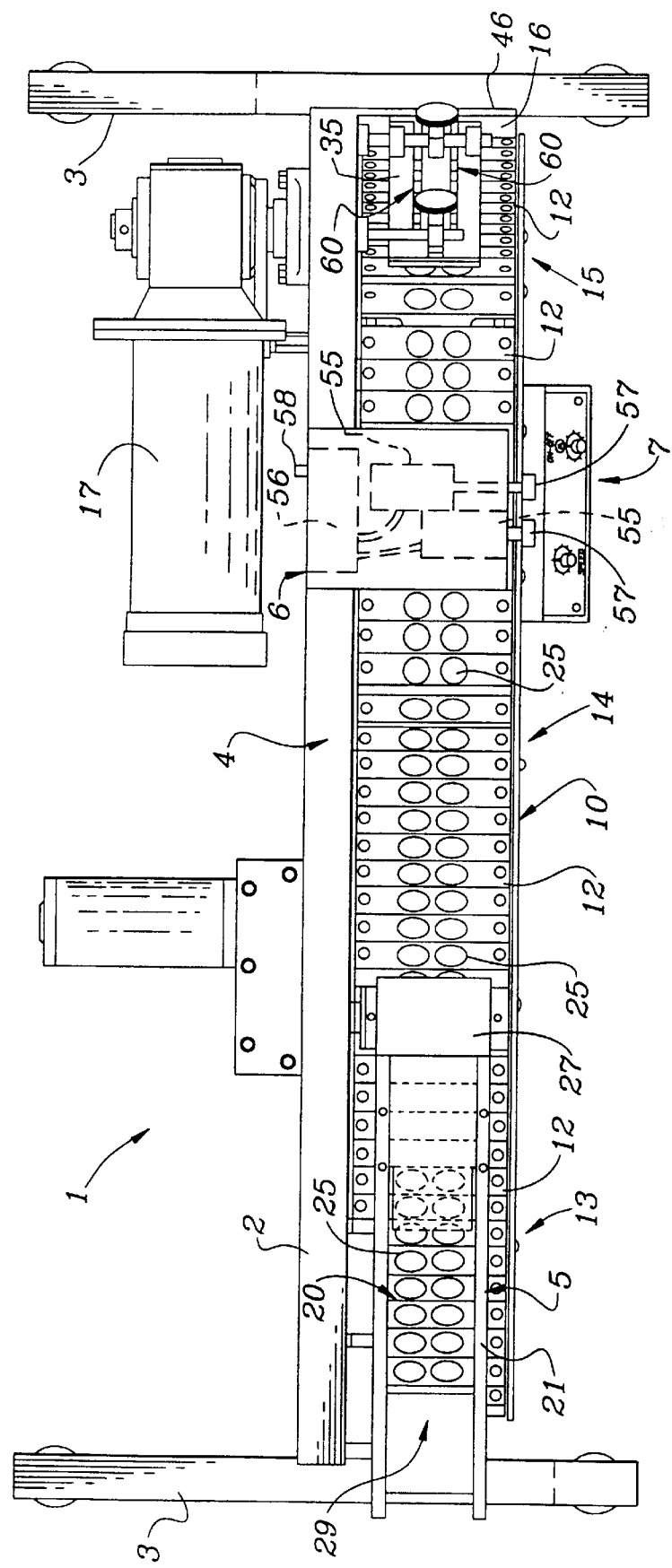
FIG. 3 is a top plan view of the apparatus of FIG. 1.
Figure 4:
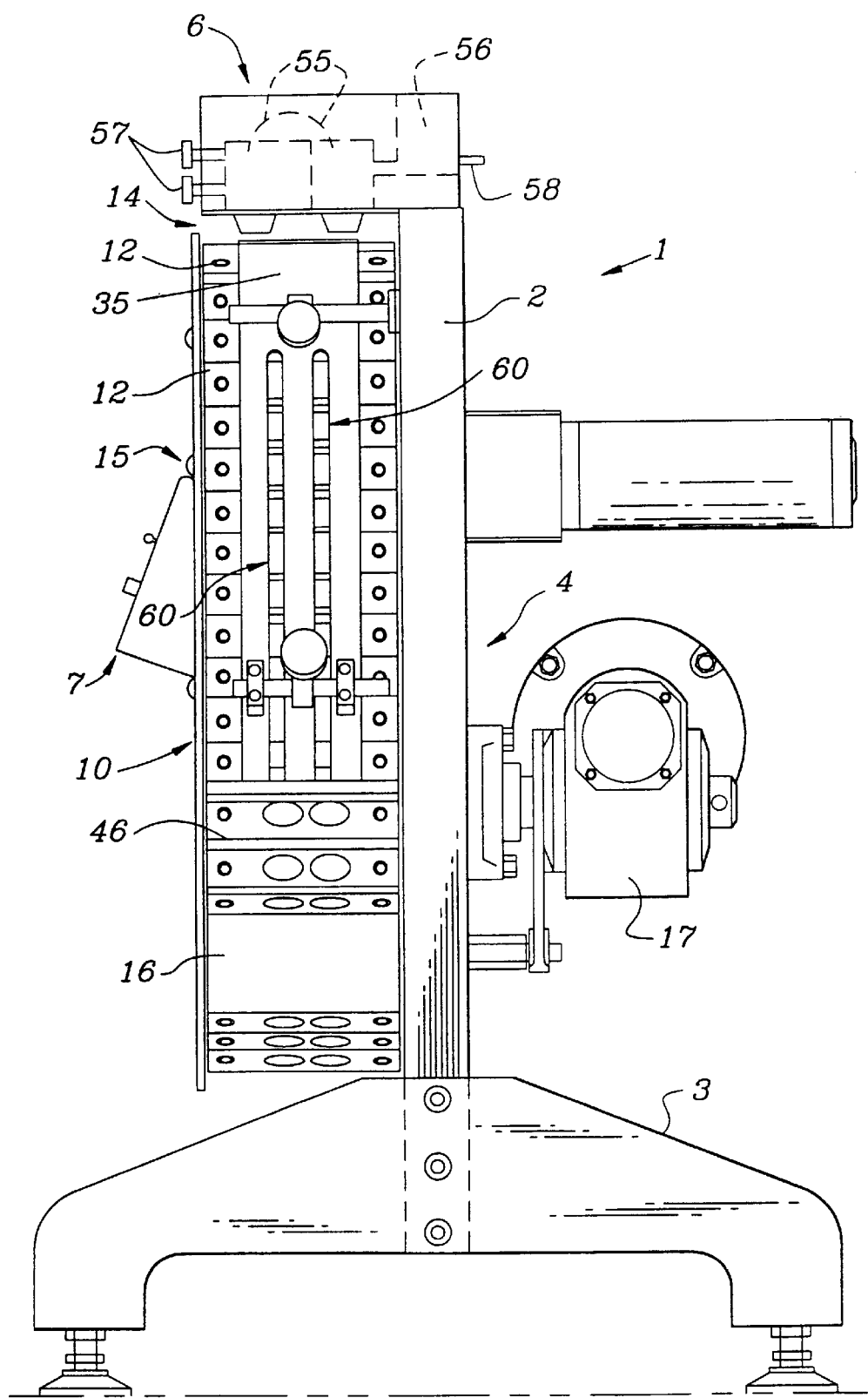
FIG. 4 is an end elevational view of the apparatus of FIG. 1.

Referring to FIGS. 2–4, the conveyor mechanism 4 takes the form a continuous chain conveyor 10 disposed upon appropriately positioned sprockets 11. The chain conveyor 10 operates to receive a series of carrier bars 12 for collecting pellets from the feed hopper 5 and for conveying the collected pellets through the pellet marking apparatus 1. In the illustrative embodiment of FIGS. 2–4, the chain conveyor 10 forms a conveyor path which initially progresses along an inclined portion 13, extending from the feed hopper 5, and which then passes to a generally horizontal portion 14. Thereafter, the chain conveyor 10 passes through a declining portion 15, eventually reaching the discharge at 16. Return of the chain conveyor 10 from the declining portion 15 to the inclined portion 13 is unsupported, allowing a degree of slack in the chain conveyor 10 to accommodate irregularities in the system. An appropriate motor/gear-reduction unit 17 is provided to operate the chain conveyor 10, in the direction of the arrow 18.

The feed hopper 5 is adapted to receive a quantity of pellets for controlled delivery to the chain conveyor 10. Pellets are introduced to the feed hopper 5, filling the cavity 20 which is defined by the enclosure 21 of the feed hopper 5, and resting upon the carrier bars 12 of the chain conveyor 10. For this reason, and to maximize the number of pellets which may be processed through the pellet marking apparatus 1, the carrier bars 12 are advantageously attached to the chain conveyor 10 in relatively close, juxtaposed relationship to one another, forming a substantially continuous conveyor surface.

The carrier bars 12 are each provided with one or more pellet receiving pockets 25, disposed transversely along their length. Accordingly, as the carrier bars 12 are drawn beneath the feed hopper 5, the pockets 25 of the carrier bars 12 operate to receive and entrain pellets from the feed hopper 5, drawing the pellets along the conveyor mechanism 4 for further processing. To be noted is that although the carriers bars 12 illustrated in FIGS. 2–4 illustrate only two such pockets 25 for each carrier bar 12, for purposes of simplicity, the carrier bars 12 may be provided with any number of pockets 25 disposed along their length, as desired, enabling significant numbers of pellets to be processed in parallel.

It is generally preferable to fill available pockets 25 of the carrier bars 12 to the extent possible, to increase the efficiency of the marking apparatus 1 and to avoid open pockets which might tend to increase the amount of ink which is accumulated in the course of the printing procedure, potentially compromising the resulting imprint. This efficiency is primarily determined by the effectiveness in transferring pellets from the feed hopper 5 to the conveyor mechanism 4. For this reason, the feed hopper 5 of the marking apparatus 1 is specially configured to optimize this transfer, as follows.

Generally speaking, the feeding system employed in accordance with the present invention is of the "ramp" type, which is particularly well suited to the entrainment of pellets for direct delivery to a printing device with a minimal amount of handling of the pellets, accordingly minimizing the potential for marring or other damage. However, further in accordance with the present invention, the feed hopper 5 is fully open along its bottom, and accordingly, fully exposed to the carrier bars 12 of the conveyor mechanism 4 which passes beneath it. Pellets for transfer to the pockets 25 of the carrier bars 12 are in this fashion provided free access to the pockets, without employing slots, fingers, or other guiding structures to direct pellets from the feed hopper 5 to the pockets 25 of the carrier bars 12. Rather, to make sure that the pockets 25 of the carrier bars 12 are filled to the extent possible, the length of the feed hopper 5 is extended to accommodate a larger number of carrier bars 12 beneath it, exposing the pockets 25 of the carrier bars 12 to the pellets contained within the feed hopper 5 for a greater period of time, and accordingly, optimizing the filling of the pockets 25 in the process.

The conveyor mechanism 4 proceeds in a generally linear fashion below the feed hopper 5, to entrain available pellets. Both the angle at which the conveyor mechanism 4 progresses beneath the feed hopper 5, as well as the length of the feed hopper 5, will depend upon the type of pellet which is to be handled, and the type of pocket which has been provided to receive the pellets. Angles between 15 and 45 degrees will generally be developed, according to need, with lengths varying from 20 to 40 inches. However, angles between 5 and 60 degrees may even provide a useful result for appropriate applications. Generally speaking, it has been found that selection of the angle which is prescribed for the ramp which is developed by the inclined portion 13 of the conveyor mechanism 4 will be more important in ensuring an entrainment of pellets by the pockets 25 of the carrier bars 12 than will selection of the length of the feed hopper 5.

As an example, in marking "Tagamet 300" tablets, an angle of 35 degrees combined with a feed hopper having a length of 35 inches has been found to provide an effective result. However, it is to be understood that these parameters are merely illustrative, and will vary in accordance with product type and pocket geometry as previously described. The length of the feed hopper will further tend to vary in accordance with the dimensional configuration of the pellet which is to be handled. For example, generally spherical (one dimensional) pellets will tend to be accommodated by shorter lengths, while two dimensional (length and width), three dimensional (length, width and height) and four dimensional (length, width, height and classified shape) pellets will tend to require progressively greater lengths to achieve an effective result.

Often, a pellet marking apparatus 1 will be dedicated to the application of markings to a particular type of pellet. In such cases, the angle selected for the inclined portion 13 of the conveyor mechanism 4 will be fixed, resulting from manufacture of the pellet marking apparatus 1. However, in many cases, a pellet marking apparatus 1 will be used to apply markings to different types of pellets (if desired, the carrier bars 25 can also be replaced with carrier bars having pockets of a different configuration), ideally calling for different angles for the inclined portion 13 of the conveyor mechanism 4. In such cases, the pellet marking apparatus 1 is advantageously provided with an adjustment mechanism 24, which is schematically shown in FIG. 2 (and in FIG. 15), to vary the angle prescribed for the inclined portion 13 of the conveyor mechanism 4 (i.e., the ramp).

A variety of devices may be used to implement the adjustment mechanism 24, such as the jackscrew arrangement which is shown, a motor-operated lifting device, or other equivalent mechanism. In each case, operation of the adjustment mechanism 24 is used to raise and lower the sprocket 11 which is shown at the position "A", together with the feed hopper 5, to correspondingly alter the angle of the inclined portion 13 of the conveyor mechanism 4 (i.e., between the sprocket 11 which is shown at "A" and the sprocket 11 which is shown at "B"). Continuous adjustments of the angle selected for the ramp which is developed by the inclined portion 13 of the conveyor mechanism 4 are thus made possible.

Another factor which has been found to be particularly important in transferring pellets from the feed hopper 5 to the conveyor mechanism 4 is the degree to which the pellets which are contained in the feed hopper 5 cover the carrier bars 12 of the conveyor mechanism 4 which progresses beneath the feed hopper 5. It has been found that if the carrier bars 12 are covered too sparcely, the efficiency of the filling procedure will tend to decrease to an unacceptable level. It has also been found that the efficiency of the filling procedure will tend to decrease if the carrier bars 12 are completely covered by the pellets. It is therefore preferred that the pellets cover approximately 40% to 90% of the carrier bars 12 passing beneath the feed hopper 5 for a proper result to be achieved. A 75% to 80% coverage is particularly preferred in this regard. It is believed that the foregoing results from the weight of pellets located over the bottom most pellets which rest upon the carrier bars 12 as they pass beneath the feed hopper 5. While it is believed that the weight of these pellets tends to assist the lower pellets in filling the pockets, which explains the lower limit specified above, it is further believed that complete coverage tends to adversely affect filling due to the displacement of pellets which are already received within the pockets of the carrier bars 12 by other pellets remaining within the feed hopper 5. Complete coverage of the carrier bars 12 can also at times lead to breakage or marring of the pellets resulting from contact between the pellets and the brush 27 which is traditionally provided at the end of the feed hopper 5, as will be discussed more fully below.

To be noted is that the open configuration of the feed hopper 5 further contributes to increased production rates by permitting the number of pellet-receiving rows provided across the carrier bars 12 to be increased freely, since partitions and guiding structures are no longer required to fill the pockets 25 provided in the carrier bars 12. As a result of this, while the operating speed of the pellet marking apparatus 1 may be maintained at a level which approximates previously existing pellet marking machines, the overall processing rate can be significantly increased by increasing (freely) the number of rows of pellet-receiving pockets for simultaneous processing.

In any event, as the chain conveyor 10 of the conveyor mechanism 4 is drawn beneath the feed hopper 5, in the general direction of the arrow 26, pockets 25 of the carrier bars 12 will become filled with pellets. Before proceeding from beneath the feed hopper 5, the carrier bars 12 and the pellets 25 which they contain will encounter a brush 27 which rotates in a direction opposite to the direction of transport of the pellets 25, as shown by the arrow 28. The brush 27 primarily operates to return pellets to the cavity 20 of the feed hopper 5 which have not been received within one of the pockets 25 of the carrier bars 12 (i.e., a misfed pellet). However, the brush 27 also operates to assist in seating the pellets which have been received within the pockets 25 of the carrier bars 12, within their respective pockets. In this fashion, pellets are reliably transferred from the feed hopper 5 to the conveyor mechanism 4, for further processing. To be noted is that should it become desirable to remove pellets from the feed hopper 5, for cleaning or servicing of the unit, a trap door 29 is provided at the rear of the feed hopper 5 which is operable by lifting the knob 30 to relieve the feed hopper 5 of its contents.

The foregoing procedures will result in the entrainment of rows of pellets within the pockets 25 of the carrier bars 12 as the carrier bars 12 are conveyed along their desired path by the conveyor mechanism 4. For uniformity of result, it is important for the pellets to be received within the pockets 25 of the carrier bars 12 so that the pellets do not unnecessarily extend from the pockets 25 (i.e., sitting in the pockets on their ends). While the rotating brush 27 operates to achieve such a result, additional measures may be provided, if desired, to further assure that the pellets are properly seated within the pockets 25 of the carrier bars 12. One such measure is to provide an additional rotating brush, similar to the brush 27, along the inclined portion 13 of the chain conveyor 10. However, since this could potentially cause pellets to be thrown from the pockets 25, it is preferred to ensure seating of the pellets by locating a vibrator 31 beneath the inclined portion 13 of the chain conveyor 10 so that the carrier bars 12 are caused to encounter a vibrating surface 32 as the carrier bars 12 are drawn along the inclined portion 13 of the chain conveyor 10. This has the added advantage of freeing the inclined portion 13 of potentially interfering structures, for purposes which will become apparent from the description which follows.

Upon transferring the pellets from the feed hopper 5 to the pockets 25 of the carrier bars 12, it then remains to apply appropriate indicia to the pellets prior to their discharge from the marking apparatus 1, at 16. The configuration of the conveyor mechanism 4 which is selected for illustration in FIGS. 2–4 provides three different areas for accomplishing this result. The embodiment illustrated shows placement of the printing head 6 along the horizontal portion 14 of the chain conveyor 10. While this placement has been selected for ease of description and illustration, it will be seen from the description which follows that it is also possible, and at times even preferable, to place the printing head 6 along the inclined portion 13 of the chain conveyor 10 or the declining portion 15 of the chain conveyor 10, as desired. It is even possible for multiple printing heads 6 to be placed along different portions of the chain conveyor 10 to allow multiple indicia (e.g., different markings, different colors, etc.) to be applied to the pellets as the pellets are conveyed through the marking apparatus 1. Further discussion of the printing head 6 will be provided below, based upon its placement along the horizontal portion 14 of the conveyor mechanism 4. Special considerations which might apply to placement of the printing head 6 at other locations along the chain conveyor 10 will be discussed where appropriate.

In any event, after receiving indicia from the printing head 6, the chain conveyor 10 will cause the pellets carried by the carrier bars 12 to progress to the declining portion 15 of the chain conveyor 10, for eventual discharge at 16. To make sure that the pellets do not fall from the carrier bars 12 in the course of traversing the declining portion 15 of the chain conveyor a guide 35 is provided which adjustably overlies the declining portion 15 of the chain conveyor 10 so that the pellets are securely retained within the pockets 25 of the carrier bars 12, without damaging or otherwise marring the pellets in the course of this transfer.

To be noted is that in FIGS. 2–4, the pockets 25 of the carrier bars 12 are simply circular (hemispherical) in configuration. In certain cases, this will be adequate to effectively receive and position pellets for processing as previously described. However, appropriate modification of the configuration of the pockets of the carrier bars 12 is often useful in providing still further assurances that the pellets proceed through the pellet marking apparatus 1 in desired fashion. To this end, the carrier bars 12 are preferably provided with configured pockets (e.g., the pockets 40 shown in FIGS. 5–8) which are especially adapted to receive and seat the pellets which are received from the feed hopper 5, including irregularly shaped pellets (such as the pellet 41 shown in FIG. 5).

Figure 8:
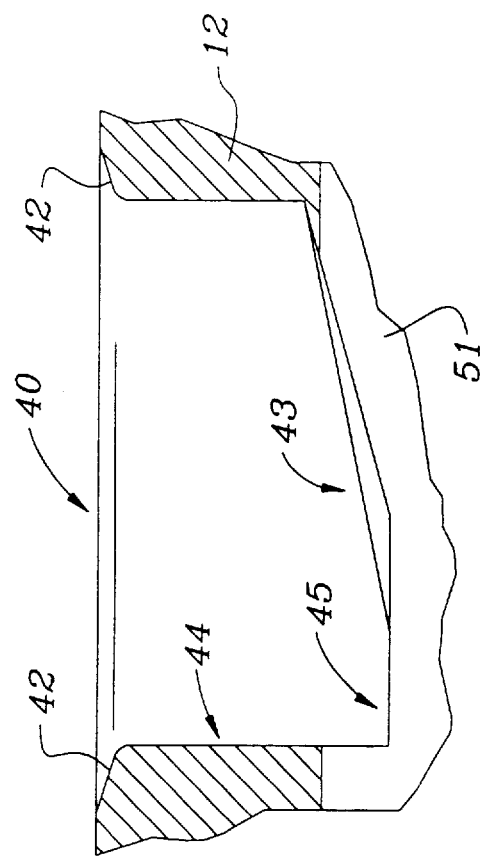
FIG. 8 is a sectional view of the pocket of FIG. 7, taken along line 8—8.
Figure 7:
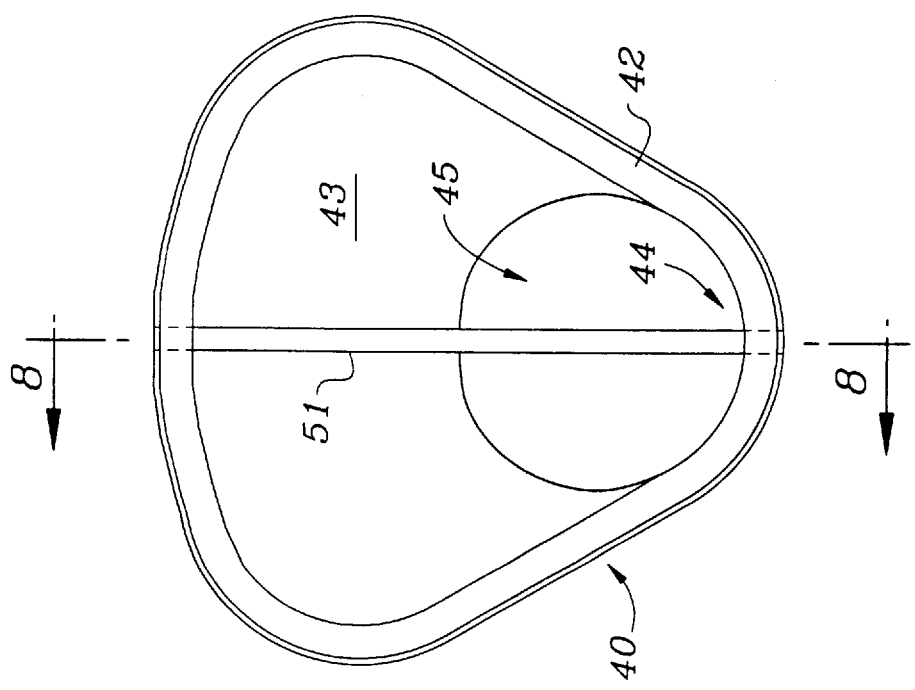
FIG. 7 is a top plan view of a pocket of the carrier bar of FIGS. 5 and 6.

Referring particularly to FIGS. 7 and 8, it is seen that the pellet receiving pockets 40 include tapered marginal portions 42 and a configured base 43. The tapered marginal portions 42 operate to facilitate transfer of the pellets from the feed hopper 5 to the pockets 40, as well as to avoid sharp edges which could potentially mar the pellets as they enter the pockets 40. The configured base 43 combines with the generally sector-shaped pocket 40 to urge a pellet toward the foot 44 of the pocket 40 so that the pellet comes to rest upon the generally circular bed 45 of the base 43. Such structure gives rise to a "funneling" effect which tends to direct pellets received within the pockets 40 toward the foot 44 and upon the bed 45, providing a known reference for use in applying indicia as will become apparent from the discussion which follows, and properly seating the pellet in this position during subsequent printing operations.

Figure 9:
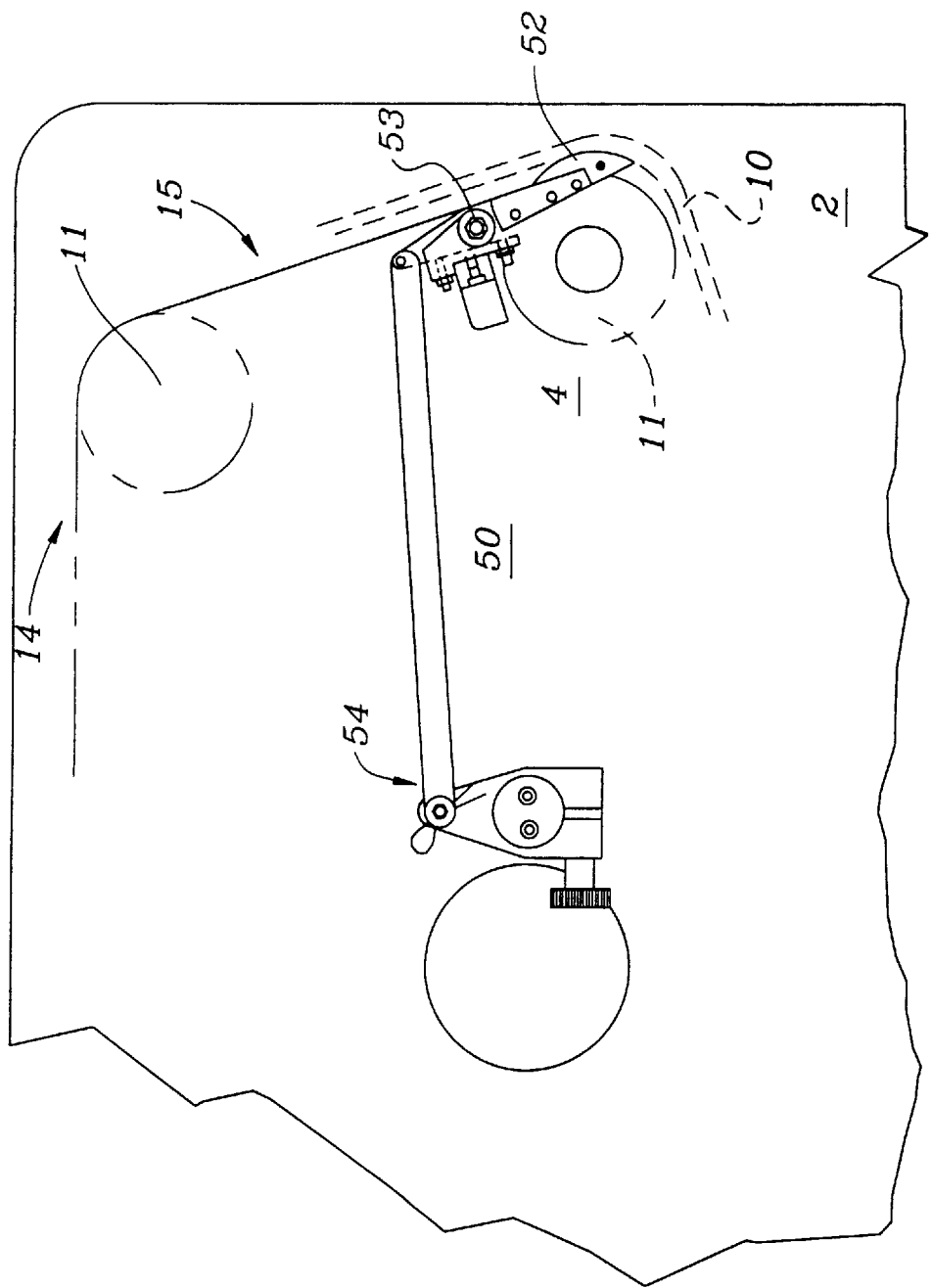
FIG. 9 is a partial, side elevational view of a knock-out mechanism for use in connection with the carrier bars of FIGS. 5 and 6.

This configuration also has the beneficial effect of facilitating discharge of the pellets from the pockets 40, at 16, under the influence of gravity. However, under certain extreme conditions such as increased temperature, the use of relatively sticky pellet coatings, or even overspray resulting from the ink used in the marking process, it is conceivable that pellets will at times become caught within the pockets 40 (or the pockets 25), preventing their reliable discharge at 16. An air jet may be provided, if desired, to assist in removal of the pellets from the pockets 25, 40 of the carrier bars 12, and to assist in drying of the ink applied to the pellets. However, to provide positive assurances that the pellets are effectively discharged from their respective pockets 25, 40, the marking apparatus 1 is preferably provided with a knock-out mechanism 50, as shown in FIG. 9, which operates in combination with a series of slots 51 provided in the carrier bars 12, as shown in FIGS. 5 and 6.

The slots 51 are configured to permit a pair of knock-out bars 52 to extend into the pellet receiving pockets 40 of the carrier bars 12, to forceably eject the pellets from the pockets 40. Although stationary knock-out bars may be used for this purpose, to further prevent potential damage or marring of the pellets being processed it is preferred that the knock-out bars 52 reciprocate so as to only briefly and lightly impact the pellets at the discharge 16. To this end, the knock-out bars 52 are pivotally mounted, at 53, to operate responsive to a bell-crank mechanism 54 which is appropriately timed to operation of the marking apparatus 1 to effectively discharge the pellets from the pockets of the carrier bars 12 as the carrier bars 12 pass the discharge 16.

The foregoing operates to convey parallel rows of pellets along the conveyor mechanism 4 and beneath the printing head 6. In the embodiment illustrated in FIGS. 1–14, the printing head 6 is adapted to apply indicia to the pellets making use of a printing mechanism which does not contact the pellets, but rather which is spaced from the pellets as the series of pellets progress beneath the printing head 6.

To this end, the printing head 6 incorporates a pair of ink-jet printing heads 55 which are positioned in general alignment with the rows of pockets 25, 40 of the carrier bars 12 so that suitable indicia may be applied to the pellets seated within the pockets 25, 40 as the carrier bars 12 pass beneath the pair of printing heads 55. Although any of a variety of ink-jet printing heads 55 may be selected for this purpose, a printing head which has been found to be particularly useful for this purpose is the "PT 80 Ink-jet Print Head" which is marketed by the Siemens Corporation. This printing head, in combination with an appropriate controller, has been found to provide effective results in accordance with the present invention, while enabling any of a variety of indicia to be applied to the pellets being processed in a simple and straightforward manner. Moreover, since ink-jet printing heads of this type are operated responsive to a microprocessor-based controller, the pattern being applied by the printing heads is readily varied without having to change design rolls or the like, as is necessary in connection with conventional contact-type printing methods. In using ink-jet printing heads of this type, it has been found that effective results can be achieved by spacing the outlet of each printing head 55 from the surface of the pellets to be imprinted by a distance on the order of 2 to 10 mm, with 3 to 5 mm being the preferred spacing for this purpose.

Any of a variety of methods may be used to properly coordinate operation of the ink-jet printing heads 55 (in accordance with signals received from their respect controllers), assure that the indicia are appropriately applied to the pellets as they pass beneath the printing head 6. For example, one of the sprockets 11 receiving the chain conveyor 10 may be provided with a slotted or apertured timing wheel which, in conjunction with an electro-optical device, may be used to detect (time) the positioning of the carrier bars 12, and the pellets which they contain. Alternatively, an electro-optical device may be positioned ahead of the printing head 6, just over the pockets 25, 40 of the carrier bars 12, to sense the anticipated arrival of pellets beneath the printing head 6. This latter configuration has the added advantage of providing a means for determining whether or not the pockets 25, 40 actually contain a pellet, so that the corresponding ink-jet printing head 55 may be enabled or disabled depending upon the status of the approaching pocket 25, 40.

In either event, proper synchronization between the timing device and the operation of the printing heads 55 operates to effectively and reliably transfer markings to the pellets as they are conveyed beneath the printing head 6. This result is further enhanced when using the configured pockets 40 of FIGS. 7 and 8 since the funneling effect developed by the configured pockets 40 operates to further assure that the pellets are positioned at a known location within the pellet receiving pockets 40, i.e., the foot 44 of the pocket 40, resting upon the bed 45.

As previously indicated, a pair of ink-jet printing heads 55 are mounted in the printing head 6 to correspondingly address each of the rows of pockets 25, 40 which are developed in the carrier bars 12 of the chain conveyor 10. These printing heads 55 may be used to apply similar, or even different indicia to the pellets being processed, as desired. However, due to the close proximity of the pockets 25, 40 of the carrier bars 12, and the relatively large size of the printing heads 55, the printing heads 55 are preferably contained within the printing head 6 in a staggered arrangement to permit appropriate alignment between the printing heads 55 and the pockets 25, 40. Differences in positioning resulting from this staggered relationship are easily accommodated by appropriately compensating the timing scheme previoulsy described, to account for these differences using the controller which operates the printing heads 55.

Referring again to FIGS. 2–4, each of the printing heads 55 are advantageously supplied with ink from a common reservoir 56 associated with the printing head 6. As previously indicated, printing quality and effectiveness will depend upon the distance established between the printing heads 55 and the pellets which are to be marked. Adjustment of this distance, as well as the lateral positioning of the printing heads 55, is enabled by the adjustment knobs 57 which are provided on the front of the printing head 6. A drain 58 may be provided for servicing purposes, if desired.

As previously indicated, placement of the printing head 6 along the horizontal portion 14 of the chain conveyor 10, as previously described, is only one of several placements for the printing head 6. If desired, the printing head 6 could similarly be placed along the inclined portion 13 of the chain conveyor 10, operating in a similar fashion. This is permitted because, apart from placement of the ink reservoir, operation of the printing heads 55 is essentially independent of their orientation. It is also possible, and indeed preferable in connection with irregularly shaped (and sized) articles, to place the printing head 6 along the declining portion 15 of the chain conveyor 10. However, in such case, special steps must be taken to assure that the desired indicia are applied as previously described despite the significant decline encountered by the pellets as they traverse the declining portion 15.

To this end, reference is made to FIGS. 10–13, which illustrate the guide 35 in further detail. To enable the ink-jet printing heads 55 of the printing head 6 to access the pellets as they traverse the declining portion 15 of the chain conveyor 10, the guide 35 is provided with a pair of longitudinally extending slots 60. Each of the slots 60 are tapered at 61 (FIG. 12), to effectively receive the ink-jet printing heads 55 so as to achieve their desired spacing from the pellets which proceed beneath the guide 35. The guide 35 is additionally provided with grooves 62 which progress fully along the length of the guide 35 to provide a channel for receiving the indicia which are applied to the pellets as the pellets progress along the declining portion 15 of the chain conveyor 10, to make sure that the ink has sufficient time to dry before encountering a solid surface. This also has the added effect of minimizing marring as the pellets progress along the guide 35.

As is best illustrated in FIG. 11, the guide 35 is fully adjustable to make sure that adequate clearance is provided between the guide 35 and the carrier bars 12 of the chain conveyor 10, to prevent binding and to avoid marring of the pellets being conveyed. Indeed, such adjustment may be used to effectively expose desired surfaces of the pellets to be marked, through the slot 60 of the guide 35, providing an accurate means for regulating the distance between the surface of the pellets and the operative surface of the ink-jet printing heads 55. Such adjustment is preferably accomplished by providing the guide 35 with mountings 63 which are adapted to variably engage a pair of eccentrics 64 associated with the frame 2 of the marking apparatus 1, although any of a variety of adjustment devices may be used for this purpose, if desired.

Placement of the printing head 6 along the declining portion 15 of the chain conveyor 10 has been found to be particularly useful in assuring a controlled application of indicia to the pellets, especially when irregularly shaped (or sized). This results from cooperation between the pockets of the carrier bars 12 and the overlying guide 35. Specifically, to maintain the close tolerances (3 to 5 mm) which are preferred for an effective application of indicia to the pellets, it is beneficial to take steps to cause the surface of each pellet to be marked to be brought into contact with the inwardly directed face 75 of the guide 35, in general registration with the slot 60. However, in practice this is difficult to maintain, especially when the pellets are irregularly shaped or sized.

Figure 14:
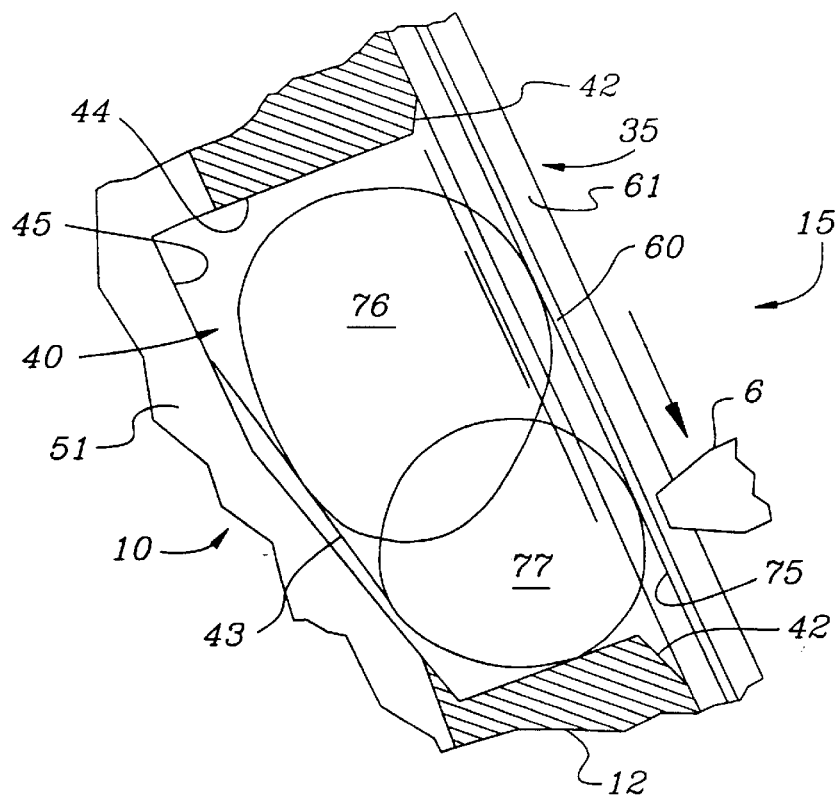
FIG. 14 is a partial, sectional view of portions of the apparatus of FIG. 1, showing the manner in which a pellet-shaped article is received between the pocket of a carrier bar and a guide fitted with an ink-jet printing head in accordance with the present invention.

To this end, and as is best illustrated in FIG. 14, as pockets 40 of the carrier bars 12 traverse the declining portion 15 of the chain conveyor 10, the configured base 43 of each pocket 40 is caused to lead the pocket 40, assuming a generally downwardly directed orientation with respect to the apparatus 1. In this fashion, the slope of the configured base 43 operates to variably receive pellets of different sizes and shapes between the configured base 43 of the pocket 40 and the guide 35 so that the pellets are drawn into appropriate contact with the inwardly directed face 75 of the guide 35. Thus, a relatively large pellet, such as the pellet 76, will be received along the configured base 43 between relatively deep portions of the pocket 40 and the guide 35, while a somewhat smaller pellet, such as the pellet 77, will be received along the configured base 43 between somewhat shallower portions of the pocket 40 and the guide 35. Irrespective of size and shape, the pellet is placed in proper registration with the guide 35, to effectively receive indicia from the printing head 6. A similar, although somewhat less pronounced result will be achieved in connection with the hemispherically-shaped pockets 25 previously described.

Of course, it is apparent that the pellet 76 and the pellet 77 will be longitudinally spaced at different positions within the pocket 40, leading to differences in timing for the application of indicia to such pellets by the printing head 6. However, this is readily accommodated by the microprocessor-based controller which is used to operate the ink-jet printing heads 55, in otherwise known fashion, when coupled with an appropriate electro-optical device for sensing the positioning of the pellets within the pockets of the carrier bars 12 as previously described.

It will therefore be seen that the foregoing structure operates to effectively apply indicia to pellet-shaped articles, including both regularly and irregularly shaped articles, without necessitating contact between the printing apparatus and the articles to be imprinted. However, referring now to FIGS. 15–17 of the drawings, it will be seen that the foregoing structure can also operate to effectively apply indicia to pellet-shaped articles using the more traditional contact-type printing procedures, if desired.

To this end, a pellet marking apparatus 80 is provided which to a large extent corresponds to the pellet marking apparatus 1 illustrated in FIGS. 1–14 of the drawings. However, in this embodiment, the ink-jet-type printing head 6 is replaced with a contact-type printing head 81. The printing head 81 corresponds in structure to known contact-type printing heads of the type used in connection with various pellet marking devices such as those earlier identified in discussing the background of this invention, and further detail regarding such structure is therefore unnecessary. The printing head 81 is preferably placed along the horizontal portion 14 of the chain conveyor 10, as illustrated, although other placements (along the inclined portion 13 or declining portion 15) are also possible if desired. In this fashion, the printing head 81 can operate to apply indicia to pellets carried by the pockets 25, 40 of the chain conveyor 10 using contact printing techniques which are in and of themselves entirely conventional.

Figure 15:
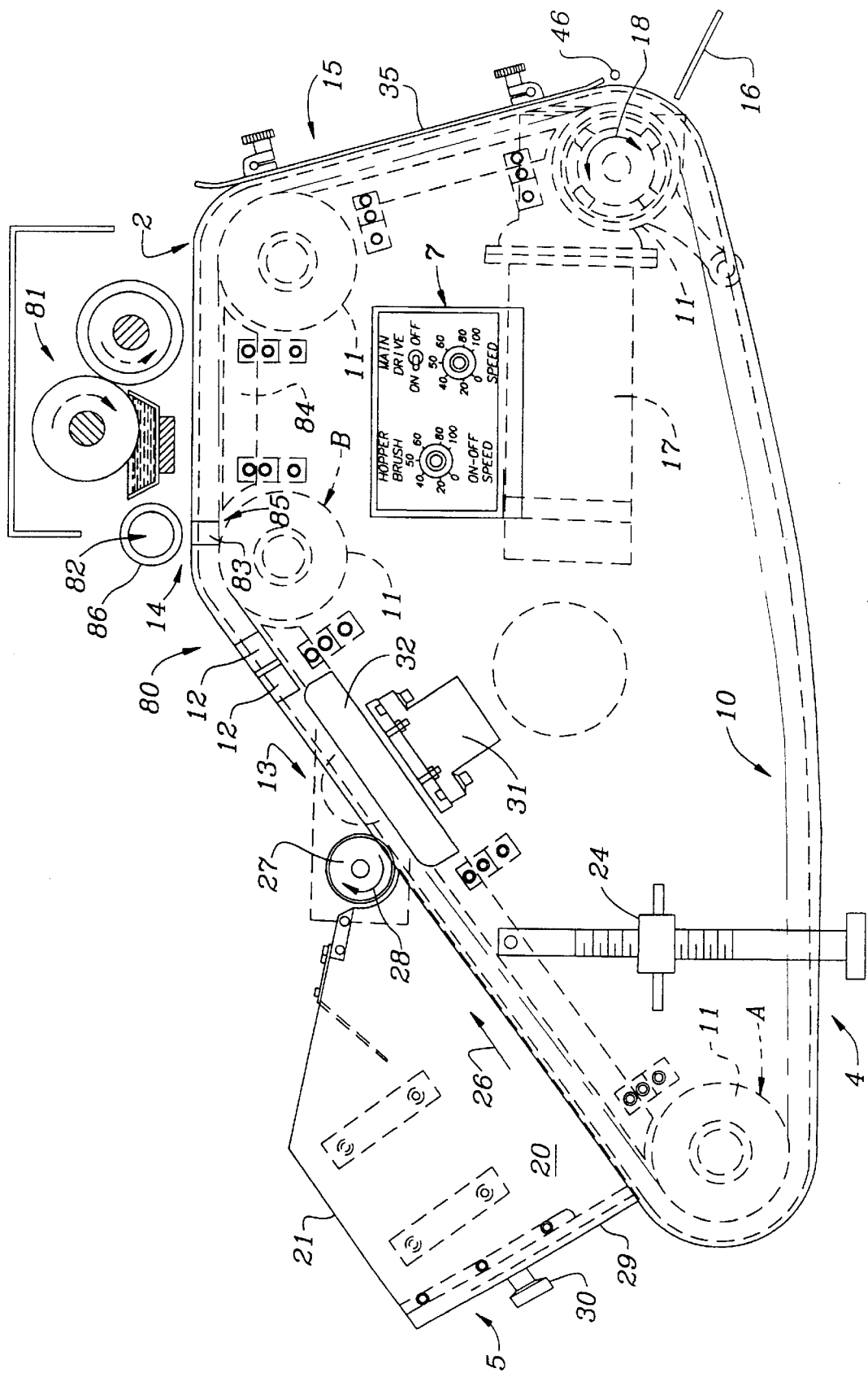
FIG. 15 is a side elevational view similar to FIG. 2, and showing an alternative embodiment pellet marking apparatus in accordance with the present invention.
Figure 16:
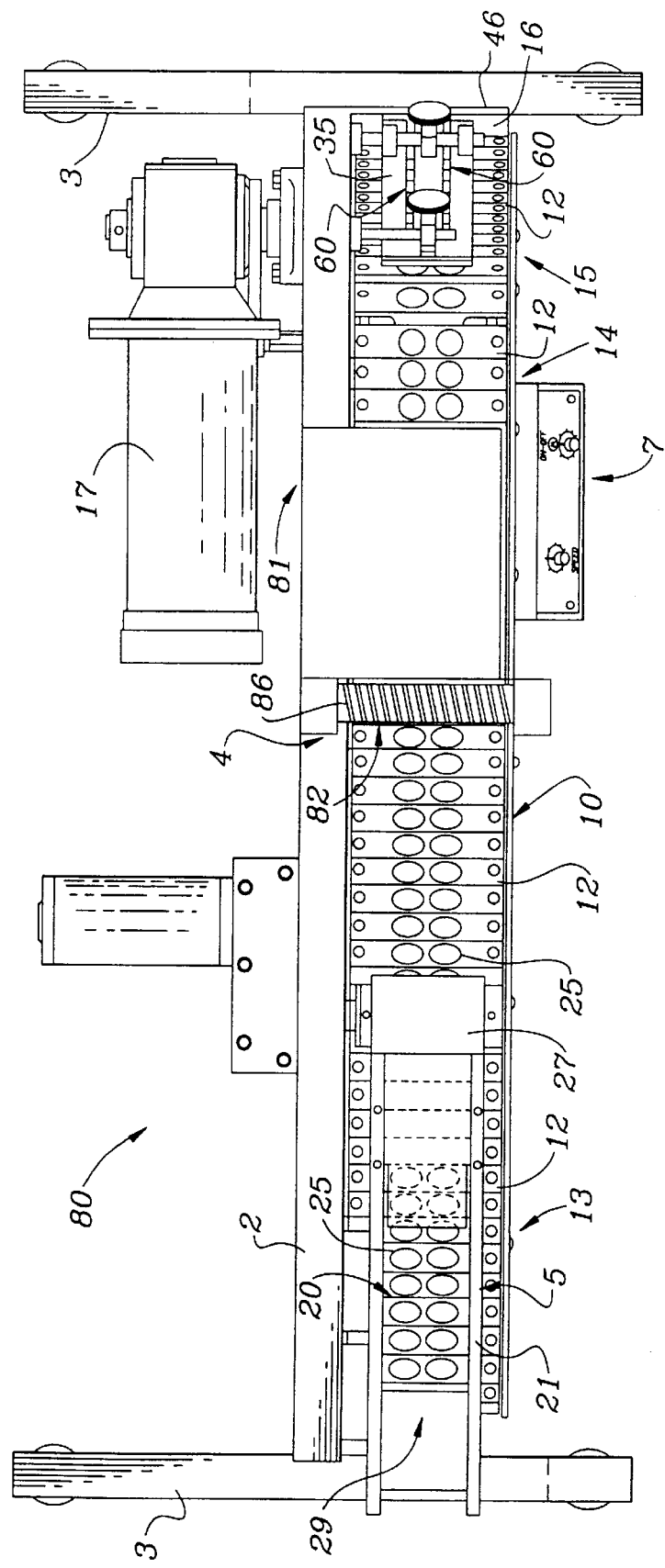
FIG. 16 is a top plan view of the apparatus of FIG. 15.

In many applications, operation of the contact-type printing head 81 in combination with the chain conveyor 10 as previously described will be sufficient to effectively apply indicia to the conveyed pellets in accordance with the present invention. However, in some applications it may become desirable to take steps to further assure that the pellets are properly aligned within their corresponding pockets 25, 40 prior to the printing procedure. This is particularly so when alignment of the pellets with respect to the printing head 81 is critical, or when it is desired to apply indicia to a particular surface (e.g., side) of a pellet. Such assurances are provided in accordance with the present invention by a rotating brush 82 which is located upstream from the printing head 81. To be noted here is that it was previously common practice to place a rotating brush of this general type immediately in advance of the printing head 81, for similar purposes. However, in accordance with the present invention, the specific placement which is shown in FIGS. 15–17 has been found to provide significantly enhanced assurances of a proper placement of the pellets within their respective pockets, as follows.

As illustrated, the brush 82 is positioned over the carrier bars 12 just after the carrier bars 12 pass from the top of the inclined portion 13 of the chain conveyor 10, to enter the horizontal portion 14. It has been found that this placement adjacent to the transition between the inclined portion 13 and the horizontal portion 14 improves the effectiveness of the rotating brush 82 in properly seating the pellets within their respective pockets 25, 40 since it is at this point that resistance between the pellets and their corresponding pockets is minimized. This is because resistance between the edge (side) of a pellet and the rearward portions of the pocket (e.g., the foot 44 of the pocket 40) is reduced as the pocket leaves the inclined portion 13 of the chain conveyor 10, while resistance between the bottom of the pellet and the bottom portions of the pocket (e.g., the base 43 and bed 45 of the pocket 40) is minimized since the horizontal portion 14 of the chain conveyor 10 has not yet been entered. Moreover, this positioning is advantageously located at a position between the sprocket 11 which receives the chain conveyor 10 and the rails 84 which then operate to support the chain conveyor 10 as it progresses along the horizontal portion 14, in an open region 85 which is best illustrated in FIG. 15 of the drawings. This provides the added benefit of allowing the transitional carrier bar 83 to in essence float between the sprocket 11 and the rails 84, permitting the pellet (or pellets) to be jossled to a limited extent as the carrier bar 83 makes this transition. These factors combine to facilitate orientation and alignment of the pellets within their respective pockets 25, 40 by the rotating brush 82 which is then located immediately above the carrier bar 83 as it traverses the open (unsupported) region 85.

The rotating brush 82 incorporates bristles 86 which are preferably disposed in a spiral so as to develop a side resultant which facilitates the jossling of an incorrectly aligned pellet at this transition. The spacing of the bristles 86 from the surface 87 of the carrier bar 83, and accordingly the height of the bristles 86 with respect to the pellets passing beneath the rotating brush 82, as well as the stiffness of the bristles 86, will generally vary with the particular type of pellet which is to be processed by the marking apparatus 80. However, it is generally preferable for the bristles 86 to be spaced from the surface 87 of the carrier bar 83 so that the bristles 86 will only come into contact with pellets which are incorrectly aligned, while permitting correctly aligned pellets to freely pass beneath them. In this fashion, only incorrectly aligned pellets will be operated upon by the bristles 86, while correctly aligned pellets will remain undisturbed by them.

Figure 17:
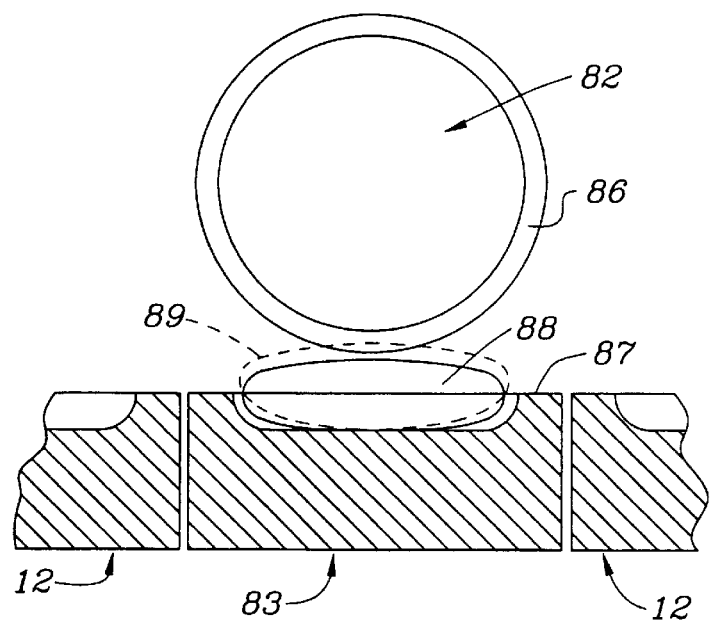
FIG. 17 is a partial, side elevational view of portions of the apparatus of FIG. 15, showing the manner in which a pellet-shaped article is oriented and aligned in accordance with the present invention.

For example, and referring now to FIG. 17, it will be seen that an incorrectly aligned pellet 88 will be engaged by the rotating brush 82 so that the bristles 86 will contact the incorrectly aligned pellet 88 and cause the pellet 88 to assume a proper orientation for the subsequent contact printing procedure which is to take place. However, a correctly aligned pellet 89 will not be contacted by the bristles 86 of the brush 82, permitting the pellet 89 to pass beneath the brush 82 without being disturbed. In either case, the pellet is made ready (effectively aligned) for the subsequent contact printing procedure which is to take place, giving rise to an improved result.

It should be understood that the foregoing structures are capable of variation without departing from the spirit and scope of the present invention. For example, the configuration of the conveyor mechanism 4 may be freely varied. The embodiment illustrated in FIGS. 1–17 of the drawings allows placement of the printing heads 6, 81 along any of three different portions of the chain conveyor 10, either individually or in plural combinations. However, other conveyor mechanisms may be used, if desired, depending upon the desired placement for the printing heads. For example, a significantly simplified conveyor mechanism 65 is shown in FIG. 18 which is effectively used in receiving a printing head 6, 81 along its inclined portion 66, downstream from the region which would receive the feed hopper 5. FIG. 19 illustrates a conveyor mechanism 67 which allows a printing head 6, 81 to be positioned either along its inclined portion 68 or its horizontal portion 69. FIG. 20 illustrates a conveyor mechanism 70 which allows a printing head 6, 81 to be positioned either along its inclined portion 71 or its declining portion 72. Other configurations are also possible. To be noted is that the placement of a printing head 6 along the declining portion 72 of the conveyor mechanism 70 provides the same benefits as did placement of the printing head 6 along the declining portion 15 of the chain conveyor 10. Also to be noted is that similar benefits are achievable by placing a printing head 6 along other sloping portions of the conveyor mechanisms 65, 67, 70, such as the inclined portions 66, 68, 71 (or even the inclined portion 13 of the chain conveyor 10), provided the pockets of the carrier bars are properly oriented (e.g., by reversing the pockets 40 so that their configured bases 43 face in a generally downwardly or declining orientation with respect to the pellet marking apparatus 1 when traversing such inclined portions).

Also capable of variation is the configuration of the carrier bars 12 which are supported by the chain conveyor 10. Some of these modifications have already been discussed. However, it is to be understood that any of a number of different pocket configurations may be used in connection with the carrier bars 12, to accommodate different pellet types, and that any number of pockets may be provided longitudinally along the length of the carrier bars to develop additional rows for applying indicia, as desired. For example, the pocket configurations may be freely varied since the pockets are primarily empirically designed based on the actual shape of the pellet to be printed (which will vary) with necessary contours and reliefs to obtain the maximum possible (preferably 100%, with a minimum acceptable value of 86%) rate of fill while still retaining the proper amount of protrusion above the surface of the carrier bar (for contact-type printing) in order to apply a logo with consistent registration on the pellet and in the desired location (generally centered). The number of pockets may be varied by simply varying the number of pockets which are placed in line along the manufactured carrier bars. However, in accordance with the present invention, this can further be accomplished by staggering the pockets (e.g., the pockets 91) on carrier bars 12' such as are shown in FIG. 21 of the drawings, to achieve an even greater pocket density if desired. This staggered arrangement is also rather advantageous in connection with pockets which are either too large, or too irregularly shaped, to be accommodated in-line along the carrier bar in conventional fashion. If desired, it is even possible to stagger the pockets (e.g., the pockets 92) along carrier bars 12" having scalloped edges 93, as shown in FIG. 22 of the drawings, to permit limited extension of the pockets 92 beyond the conventional confines of the carrier bars. To be noted is that the scalloped edges 93 of the carrier bars 12" should be offset, as shown, so that the scalloped edges of adjacent carrier bars will combine to define the substantially continuous conveyor surface which is needed to effectively receive pellets from the feed hopper 5 as previously described.

Also capable of variation are the printing heads 6, 81 which are selected for use in connection with the present invention, as well as the physical structures which are use to mount and position the printing heads as previously described. This will include variations in the ink-jet printing head 6 of FIGS. 1–14, which is useful in applying indicia to pellets which are generally recessed within the pockets that receive them (see the pellet 77 shown in phantom in FIG. 14), variations in the contact-type printing head 81 of FIGS. 15–17, which is useful in applying indicia to pellets which protrude from the pockets that receive them (see the pellet 88 shown in FIG. 17), or even other types of printing devices that may be used to apply indicia to pellets.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A method for maximizing printing and pellet loading efficiency of a machine having a printing station for marking indicia on pellet shaped articles to be loaded in a hopper mounted on a ramped section of a conveyor passing beneath the hopper, said conveyor including a plurality of carrier bars having pockets structured to receive the pellet shaped articles from the hopper in the ramped section, the ramped section being angled at an angle of incline optimized for the pellet shaped articles, said method comprising the steps of:

evaluating dimensional and conveying characteristics of a plurality of pellet shaped articles;

determining the optimum angle of incline of the ramped section; and setting the angle of incline of the ramped section based on the characteristics of the pellet shaped articles without requiring independent adjustment in the printing station, such that printing and pellet loading efficiency are maximized.

2. The method according to claim 1, further comprising fixing the angle of incline of the ramped section at said optimum angle of incline.

3. The method according to claim 1, wherein the angle of incline is set to between about 5°–60°.

4. A method for maximizing operating speed and pellet loading efficiency of a machine having a plurality of inter-related machine stations including a printing station for marking indicia on pellet shaped articles to be loaded in a hopper mounted on a ramped section of a conveyor passing beneath the hopper, said conveyor including a plurality of carrier bars having pockets structured to receive the pellet shaped articles from the hopper in the ramped section, the ramped section being angled at an angle of incline optimized for the pellet shaped articles, said method comprising the steps of:

evaluating dimensional and conveying characteristics of a plurality of pellet shaped articles;

determining the optimum angle of incline of the ramped section; and setting the angle of incline of the ramped section based on the characteristics of the pellet shaped articles without adversely impacting operation of any of the other machine stations, such that operating speed and pellet loading efficiency are maximized.

5. The method according to claim 4, further comprising fixing the angle of incline of the ramped section at said optimum angle of incline.

6. The method according to claim 4, wherein the angle of incline is set to between about 5°–60°.

* * * * *